(12) United States Patent
Bocking et al.

(10) Patent No.: US 11,691,319 B2
(45) Date of Patent: Jul. 4, 2023

(54) METHOD OF FORMING AN ARTICLE

(71) Applicant: Bockatech, Ltd., Huntingdon (GB)

(72) Inventors: Chris Bocking, Reading (GB); Peter Clarke, Graffham (GB)

(73) Assignee: Bockatech Ltd., Huntingdon (GB)

( * ) Notice: Subject to any disclaimer, the term of this patent is extended or adjusted under 35 U.S.C. 154(b) by 243 days.

(21) Appl. No.: 16/953,645

(22) Filed: Nov. 20, 2020

(65) Prior Publication Data
US 2021/0069943 A1 Mar. 11, 2021

Related U.S. Application Data

(62) Division of application No. 16/072,545, filed as application No. PCT/EP2017/052291 on Feb. 2, 2017.

(30) Foreign Application Priority Data

Feb. 3, 2016 (GB) ...................................... 1601946

(51) Int. Cl.
B29C 44/02 (2006.01)
B65D 1/44 (2006.01)
(Continued)

(52) U.S. Cl.
CPC ............ B29C 44/027 (2013.01); B29C 44/06 (2013.01); B29C 44/141 (2013.01); B29C 44/42 (2013.01);
(Continued)

(58) Field of Classification Search
CPC ........ B65D 1/265; B65D 1/48; B65D 25/107; B65D 21/0216; B65D 5/5085;
(Continued)

(56) References Cited

U.S. PATENT DOCUMENTS 3,126,139 A 3/1964 Schechter
3,169,688 A 2/1965 Schad
(Continued)

FOREIGN PATENT DOCUMENTS

CN 103717500 * 4/2014
DE 7227210 10/1972
(Continued)

OTHER PUBLICATIONS

Search Report and Written Opinion in related Singapore application No. 10202006653V dated Nov. 26, 2021.
(Continued)

*Primary Examiner* — Stella K Yi
(74) *Attorney, Agent, or Firm* — Polsinelli, P.C.

(57) ABSTRACT

Methods of forming an article from a molten plastic composition comprising a polymer and a blowing agent. The methods include injecting the molten plastic composition into a mould, allowing the plastic composition to form a first solid skin adjacent to an in contact with a first cavity-forming surface of the mould and a second solid skin adjacent to and in contact with a second cavity-forming surface of the mould, and then opening the mould before the molten plastic composition between the first and second solid skins in at least one portion of the circumference of a region of the mould cavity defining an annular cross-section of the cavity has solidified.

20 Claims, 10 Drawing Sheets

(51) Int. Cl.

| | | |
|---|---|---|
| *B65D 81/38* | (2006.01) | |
| *B60J 10/18* | (2016.01) | |
| *B60J 10/21* | (2016.01) | |
| *B60J 10/34* | (2016.01) | |
| *B60J 10/70* | (2016.01) | |
| *B60J 1/00* | (2006.01) | |
| *B65D 1/26* | (2006.01) | |
| *B29C 44/06* | (2006.01) | |
| *B29C 44/14* | (2006.01) | |
| *B29C 44/42* | (2006.01) | |
| *B29L 31/00* | (2006.01) | |
| *B29C 45/17* | (2006.01) | |
| *B29K 105/04* | (2006.01) | |
| *B29C 44/04* | (2006.01) | |
| *B29K 23/00* | (2006.01) | |
| *B29K 623/00* | (2006.01) | |

(52) U.S. Cl.
CPC .............. *B60J 1/00* (2013.01); *B60J 10/18* (2016.02); *B60J 10/21* (2016.02); *B60J 10/34* (2016.02); *B60J 10/70* (2016.02); *B65D 1/265* (2013.01); *B65D 1/44* (2013.01); *B65D 81/3867* (2013.01); *B65D 81/3874* (2013.01); *B29C 44/0407* (2013.01); *B29C 2045/1722* (2013.01); *B29K 2023/12* (2013.01); *B29K 2105/043* (2013.01); *B29K 2623/12* (2013.01); *B29K 2995/0094* (2013.01); *B29L 2031/7132* (2013.01); *Y02W 30/80* (2015.05)

(58) Field of Classification Search
CPC .. B65D 2501/0018; B65D 2501/24261; B65D 2501/24636; B65D 2519/00402; B65D 90/028; B65D 2501/0027; B65D 2519/00621; B65D 1/44; B65D 7/44; B65D 11/22; B65D 11/24; B65D 2501/24815; B65D 81/3453; B65D 81/3865; B65D 81/3804; B65D 81/3823; B65D 81/3834; B65D 81/3867; B29C 49/0015; B29C 48/13; B29C 2949/074
See application file for complete search history.

(56) References Cited

U.S. PATENT DOCUMENTS

| | | |
|---|---|---|
| 3,169,689 A | 2/1965 | Schwartz |
| 3,703,255 A | 11/1972 | Wade |
| 2001/0036971 A1 | 11/2001 | Usui et al. |
| 2005/0017404 A1 | 1/2005 | Youngs et al. |

FOREIGN PATENT DOCUMENTS

| | | |
|---|---|---|
| DE | 19751236 A1 | 6/1999 |
| JP | S58102720 | 6/1983 |
| SG | 11201806320 P | 8/2018 |
| WO | 9703800 | 2/1997 |
| WO | 9817456 | 4/1998 |

OTHER PUBLICATIONS

International Search Report and Written Opinion in related PCT application, PCT/EP2017/052291, dated May 9, 2017.

Combined Search and Examination Report issued by Intellectual Property Office of Great Britain, dated Jun. 23, 2016.

"Selective Foaming' Makes Parts Strong and Lightweight", Modern Plastics International, McGraw-Hill, Inc., Lausanne, CH, vol. 26, No. 1, Oct. 1, 1996.

Examination Report in related European Application No. 17702641.6 dated Jun. 4, 2021.

* cited by examiner

METHOD OF FORMING AN ARTICLE

FIELD OF THE INVENTION

The present invention relates to the formation of foamed plastic articles, e.g. cups or containers for food.

BACKGROUND

In the packaging industry, a commonly-used type of disposable cup (for example, take-away coffee cups) is a paper cup with an inner lining of a plastic material, e.g. low-density polyethylene (LDPE). As these cups are made of two different materials which can be difficult and/or costly to separate, their recycling can prove challenging. Furthermore, as there is a seam down one side of the cup where the paper material is joined together, liquid may leak from the area of the join at the rim of the cup when the cup is tilted for consuming the beverage within (particularly when the cup is used in connection with a lid having a mouthpiece through which the beverage passes for consumption).

Efforts have been made in the industry to provide disposable polypropylene cups. For example, US-A-2014/0166738 discloses a blank made of a cellular polymeric material such as polypropylene, which blank can then be formed into a cup. However, a seam is still present in the cup of US-A-2014/0166738, and the final cup must be made by way of folding the blank and sealing the various edges thereof together. Furthermore, in conventional injection moulding a thick wall is required to create some thermal insulation in a cup. Typically, a cellular structure provides the thermal insulation, and a blowing agent is added to the thermoplastic polymer to create a foamed structure to further improve the thermal insulation, and to reduce the density of the foamed wall. However, for a given wall thickness the maximum density reduction achievable by foaming is 30 wt % based on the weight of the thermoplastic polymer in the wall.

SUMMARY OF THE INVENTION

The present invention aims at least partially to overcome the problems with existing disposable containers. In particular, there is a need in the art for containers which are easily recyclable. It is also desirable to reduce the amount of material used to make each container, whilst still providing a container which has good thermal insulation properties and the required level of stiffness.

In a first aspect, the present invention provides a method of forming an article, the method comprising:

(a) providing a mould having an outer part and an inner part, the outer part having a first cavity-forming surface and the inner part having a second cavity-forming surface;

(b) closing the mould thereby defining a cavity between the first and second cavity-forming surfaces wherein, at least one region of the cavity defining an annular cross-section of the cavity between outer and inner circumferential edges of the cavity, the first cavity-forming surface is such that a distance between the first cavity-forming surface and the second cavity-forming surface alternates between a first distance and a second distance around at least a portion of the circumference of the region, the first distance being greater than the second distance;

(c) injecting a molten plastic composition comprising a polymer and a blowing agent into the cavity;

(d) allowing the plastic composition to form, in the said at least one region, a first solid skin adjacent to and in contact with the first cavity-forming surface and having a first circumferential length, and a second solid skin adjacent to and in contact with the second cavity-forming surface and having a second circumferential length, wherein the plastic composition between the first and second solid skins remains molten, to form, respectively where the distance between the first cavity-forming surface and the second cavity-forming surface alternates between the first distance and second distance, alternating first and second thicknesses of the plastic composition, each first and second thickness comprising the first and second skins with molten plastic composition therebetween;

(e) opening the mould before the plastic composition between the first and second solid skins has solidified, thus allowing the plastic composition between the first and second solid skins, and the molten plastic composition at the alternating first and second thicknesses of the plastic composition, to expand by foaming, wherein said opening comprises removing the outer part of the mould so that the first solid skin is no longer in contact with the first cavity-forming surface, while maintaining the second solid skin in contact with the second cavity-forming surface.

The second solid skin may be maintained in contact with the second cavity-forming surface until expansion of the plastic composition between the first and second solid skins is complete.

The first and second distances, and correspondingly the first and second thicknesses, are configured to provide an alternating series of peaks and troughs, or ribs and valleys, around the circumference of the injection moulded composition. These values can be constant values or alternatively both the first and second distances and thicknesses can independently vary around the circumference. In some embodiments of the present invention, the first and second distances and thicknesses are constant values around the circumference. In other embodiments of the present invention, the second distance/thickness is a constant value around the circumference and the first distance/thickness varies around the circumference. In other embodiments of the present invention, the first distance/thickness is a constant value around the circumference and the second distance/thickness varies around the circumference. In other embodiments of the present invention, the second distance/thickness is a constant value around the circumference and the first distance/thickness varies in alternation between two different first values around the circumference. In other embodiments of the present invention, the first and second distances/thicknesses both independently vary around the circumference.

In a second aspect, the present invention provides a hollow article for use as a beverage cup, or as a container, the hollow article having an annular sidewall and a base wall defining a central hollow cavity, a top rim of the sidewall and a bottom end of the sidewall, wherein the annular sidewall comprises a plastics material composed of a sandwich structure of inner and outer skins and an expanded cellular foam layer therebetween, wherein the expanded cellular foam layer comprises an annular array of reinforcing areas extending longitudinally along the sidewall in a direction between the top rim and the bottom end, the reinforcing areas being mutually separated by an annular array of spacer regions extending longitudinally along the sidewall in a direction between the top rim and the bottom end to provide alternating reinforcing areas and spacer regions around the annular sidewall, wherein the reinforcing areas comprise expanded cellular foam of a first density and the spacer regions comprise expanded cellular foam of a second density, wherein the first density is higher than the second density.

Preferred features of each aspect are defined in the respective dependent claims.

Advantages of present invention are that the container formed by the method thereof is easily recyclable and reusable, has no join in the material through which leakage of a liquid contained thereon could occur, has the required level of stiffness, and also possesses good thermal insulation properties. Furthermore, the present invention allows for less material to be used for the manufacture of each container (hence reducing manufacturing costs).

Using the present invention, it is possible to achieve a density reduction of 200% between the density of the thermoplastic resin in its unfoamed state and the density of the thermoplastic material in the cup, which includes regions of expanded cellular foam and unfoamed regions.

The present invention is at least partly predicated on the finding by the present inventor that the provision of a first cavity forming surface which is such that a distance between the first cavity-forming surface and the second cavity-forming surface alternates between a first distance and a second distance (the first distance being greater than the second distance) allows for a reduction in the amount of material used to form the article, and also thus in a reduction in the weight of the article. In particular, in the first aspect, the present inventor has discovered that the first solid skin (as formed prior to opening the mould) can be "blown out" by foaming of the molten plastic composition upon opening the mould (the mould being opened prior to solidification of the molten plastic composition between the first and second skins). A distance between the first and second solid skins of the finished article may be substantially constant around the circumference of the finished article. Thus, the method of the present invention uses less material but provides a finished product which is similar in appearance to the product obtained when the distance between the first cavity-forming surface and the second cavity-forming surface in the mould remains constant rather than alternating between a first and second distance.

In the second aspect, the present inventor has found that, when forming a finished container in which some areas comprise expanded plastic composition and some areas comprise non-expanded plastic composition, the provision of the first cavity-forming surface which is such that a distance between the first cavity-forming surface and the second cavity-forming surface alternates between a first distance and a second distance around at least one first portion of the circumference of the region (the first portion being the area which expands upon opening of the mould), makes it possible to reduce that amount of material used to form the article, and also hence reduce the weight of the article. In particular, the first solid skin in the first portion (as formed prior to opening the mould) can be "blown out" by foaming of the molten plastic composition between the first and second skins in the first portion, so that the first skin is convex in the first portions in the finished article. Thus, the method of the present invention uses less material but provides a finished product which is similar in appearance to the product obtained when the distance between the first cavity-forming surface and the second cavity-forming surface in the mould remains constant rather than alternating between a first and second distance.

The present inventor has also found that the articles produced by the method of the present invention also have the level of stiffness required for such articles, despite the reduction in the amount of material used therein. It has been found that as the cellular foamed plastic composition, typically a thermoplastic such as a polyolefin, typically polypropylene, cools slowly, due to its thermal insulation qualities, the crystallinity of the plastic composition can increase, which in turn can increase the rigidity of the cellular foamed plastic composition. The expansion of the molten plastic composition between the first and second skins by foaming also provides the articles with good thermal insulation properties.

Also, since the entire container may be made of a single layer of recyclable material (i.e. no layers of different materials which need to be separated), the container is easier to recycle than the commonly used plastic-lined paper cups. Where a label or outer coating (film sheet or film sleeve) is added to the container during the manufacturing method, this may also be of the same material from which the container itself is formed. For example, the polymer and the film sheet may both be formed of polypropylene.

Furthermore, as the articles are injection moulded in the methods of the present invention, there is no join present in the article through which leakage of a liquid contained therein could occur.

BRIEF DESCRIPTION OF THE DRAWINGS

Embodiments of the present invention will now be described by way of example only with reference to the accompanying drawings, in which.

DETAILED DESCRIPTION

Figure 1:
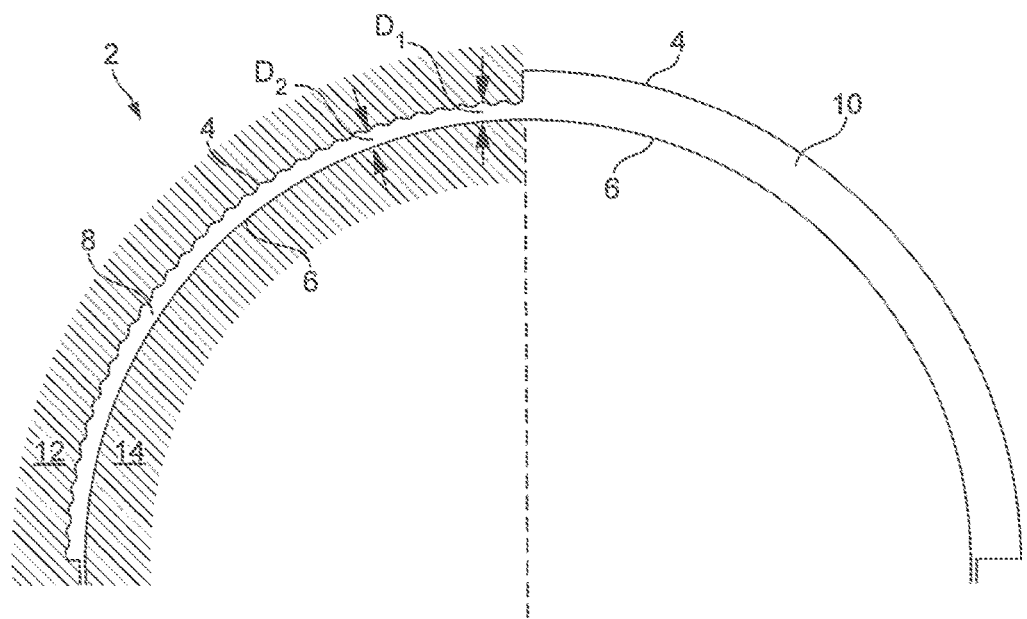
FIG. 1 is a cross-section of an article illustrating the appearance of the article at different stages in the method of the first aspect of the present invention.

Referring to FIG. 1, there is shown a cross-section of an article 2 (for example, a coffee cup) illustrating the appearance of the article at different stages in the method of the first aspect of the present invention. In particular, the left-hand side of FIG. 1 shows the first solid skin 4, the second solid skin 6 and the molten plastic composition 8 between the first and second solid skins 4, 6 at the end of step (d) of the method of the first aspect of the invention, when the article is still within the mould. FIG. 1 illustrates an embodiment where the first cavity-forming surface of the outer part 12 of the mould comprises corrugations, the corrugations in the first cavity-forming surface having peaks and troughs in the form of a sinusoidal wave (noting that a trough in the first cavity-forming surface results in a corresponding peak being formed in the article moulded therein, and vice-versa). The sinusoidal wave may have a variety of different configurations with respect to the shape and morphology of the peaks and troughs.

The corrugations may for example be U- or V-shaped and/or, for any shape of the peaks and troughs, the corrugations may have a repeatable, or regular, sequence of peaks and troughs or a non-repeatable, or random, sequence of peaks and troughs.

Typically, the peaks and troughs have some degree of curvature, with large radii of curvature. The inner part 14 of the mould, which is a mould core, is also shown. In this embodiment, the first distance $D_1$ and the second distance $D_2$ (both of which are measured perpendicular to a tangent to the second cavity-forming surface) each remain constant around the circumference of the region of the mould cavity which defines an annular cross-section of the cavity between outer and inner circumferential edges of the cavity. The first distance $D_1$ is the distance between the second cavity forming surface and a lowest point of a trough in the first cavity-forming surface and the second distance $D_2$ is the distance between the second cavity-forming surface and a highest point of a peak in the first cavity forming surface.

As explained hereinabove, the first and second distances $D_1$, $D_2$ are configured to provide an alternating series of peaks and troughs, or ribs and valleys, around the circumference of the injection moulded composition. These values can be constant values or alternatively both the first and second distances $D_1$, $D_2$ can independently vary around the circumference. In some embodiments of the present invention, the first and second distances $D_1$, $D_2$ are constant values around the circumference. In other embodiments of the present invention, the second distance $D_2$ is a constant value around the circumference and the first distance $D_1$ varies around the circumference. In other embodiments of the present invention, the first distance $D_1$ is a constant value around the circumference and the second distance $D_2$ varies around the circumference. In other embodiments of the present invention, the second distance $D_2$ is a constant value around the circumference and the first distance $D_1$ varies in alternation between two different first values around the circumference. In other embodiments of the present invention, the first and second distances $D_1$, $D_2$ both independently vary around the circumference.

The right-hand side of FIG. 1 shows the first solid skin 4, the second solid skin 6, and the plastic composition between the first and second solid skins 4, 6, which plastic composition 10 has expanded by foaming and solidified. In the right-hand side of FIG. 1, the outer part 12 of the mould has been removed from the article and the article remains on the inner part 14 or core. As can be seen, the expansion has resulted in the areas formed in the first solid skin 4 where the distance is the second distance $D_2$, being "blown out" so that the distance between the first and second solid skins 4, 6 of the finished article is substantially constant (e.g. varies by up to plus or minus 2% as compared to the average distance between the first and second skins) around the circumference of the article.

At the end of step (d) in the methods of both the first and second aspects of the present invention, the areas where the distance between the first and second cavity-forming surfaces is the first distance $D_1$ (referred to henceforth as the "ribs") will store latent heat, and will be hotter than those areas where the distance between the first and second cavity-forming surfaces is the second distance $D_2$ (referred to henceforth as the "valleys"). The ribs act as flow promoters during the filling phase of the injection moulding process, i.e. step (b) in the methods of the first and second aspects of the present invention. As the injected material takes the path of least resistance, the ribs will be the hottest parts of the article. This storage of latent heat allows the first solid skin 4 to be deformed upon opening of the mould by the pressure of the gas released from the blowing agent. This pressure acts to pull the first solid skin 4 away from the second solid skin 6. This occurs at the ribs first (i.e. the hottest part of the article), and the pressure of the first skin 4 being pulled away at the area of the angled parts of these ribs (either side of the highest point $D_1$ of the rib) then acts to pull the first skin 4 away from the second skin 6 at the area of the adjacent valleys. This effect (termed the "wedge effect") is discussed in more detail, below.

Figure 2A:
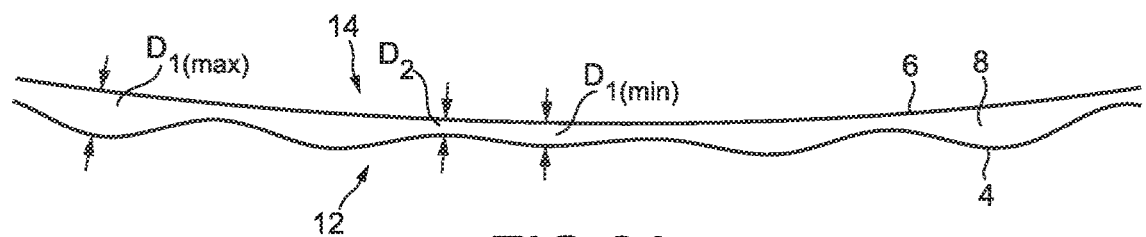
FIG. 2A shows a cross-section through a part of the article at the end of step (d) of one embodiment of the method of the first aspect of the present invention, when the article is still within the mould.

FIG. 2A shows a cross-section through a part of the article at the end of step (d) of one embodiment of the method of the first aspect of the present invention, when the article is still within the mould. As in FIG. 1, the first solid skin 4, the second solid skin 6 and the molten plastic composition 8 between the first and second solid skins 4, 6 are shown. In this embodiment, the first cavity forming surface of the outer part 12 of the mould again comprises corrugations, the corrugations having peaks and troughs. However, in contrast to the embodiment shown in FIG. 1, the first distance $D_1$ varies around the circumference of the region of the mould cavity which defines an annular cross-section of the cavity between outer and inner circumferential edges of the cavity. In particular, the first distance $D_1$ is at a maximum value $D_{1(max)}$ at every fourth trough of the mould cavity, and the first distance reaches a minimum value $D_{1(min)}$ at each trough which is midway between two troughs at which the first distance is at the maximum value. Again, it is noted that a trough in the first cavity-forming surface of the mould results in a corresponding peak being formed in the article moulded therein, and vice-versa. In the embodiment shown in FIG. 2A, the second distance $D_2$ remains constant around the circumference of the region of the mould cavity.

Figure 2B:
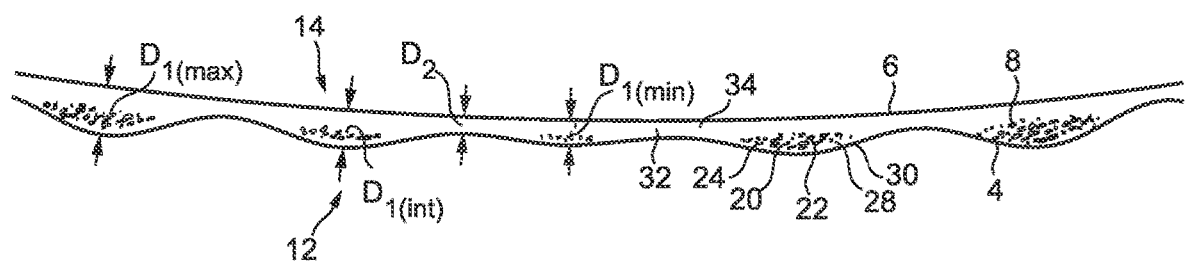
FIG. 2B shows the cross-section as shown in FIG. 2A, illustrating the density of the molten plastic composition at different areas within the non-expanded article, when the article is still within the mould.

FIG. 2B shows the cross-section as shown in FIG. 2A, illustrating the density of the molten plastic composition 8 at different areas within the non-expanded article. As can be seen from this Figure, the density of the molten plastic composition 8 (prior to its expansion by foaming between the first and second solid skins) varies from higher density in those areas where the distance between the first and second cavity-forming surfaces of the mould is the second distance $D_2$, to lower density in those areas where the distance between the first and second cavity-forming surfaces is the first distance $D_1$—the lower density areas 20 are represented by open cells 22 indicating the presence of expanded cellular foam 24 in the outer parts 28 of the ribs 30. In the first and second solid skins 4, 6 themselves, and in the small thickness regions 32, for example the valleys 34, other than the outer parts 28 of the ribs 30, the density of the molten plastic composition 8 is very high, with minimal or no foaming.

In the cross-section shown in FIG. 2B, while the article is in the mould, the rib where the first distance is $D_{1(min)}$ will be starting to cool and solidify at the point of opening the mould. The ribs where the first distance is denoted as "$D_{1(int)}$" ($D_{1(int)}$ being a value between $D_{1(min)}$ and $D_{1(max)}$), will cool faster than the ribs where the first distance is $D_{1(max)}$. The ribs where the first distance is $D_{1(max)}$ will thus retain the most heat, and will be the hottest areas of the article upon opening of the mould. Similarly to the discussion above, this allows the first solid skin 4 to be deformed at the ribs with first distance $D_{1(max)}$ upon opening of the mould, by the pressure of the gas released from the blowing agent. This pressure acts on the whole of the outer solid skin 4, the inner solid skin 6 being supported by the mould core 14.

The pressure acts to push the first, outer, solid skin 4 away from the second, inner, solid skin 6. The pushing apart of the first and second skins 4, 6 is at the area of the valleys which have retained a high concentration of blowing agent. The first, outer, solid skin 4 may be further pushed away from the second, inner, solid skin 6 in the vicinity of the ribs where there is sufficient pressure from the remaining blowing agent which was not expanded within the injection mould.

Figure 3:
FIG. 3 shows a cross-section through the fully expanded article after opening the mould in step (e)

FIG. 3 shows the fully-expanded article in which the first, outer solid skin 4" has been fully pushed away from the second, inner, solid skin 6 across the area of the both the ribs, which may have first distance $D_{1(max)}$, $D_{1(min)}$, and $D_{1(int)}$, and the valleys between these ribs having the second distance D2, which may be the same or variable for the valleys.

Figure 4A:
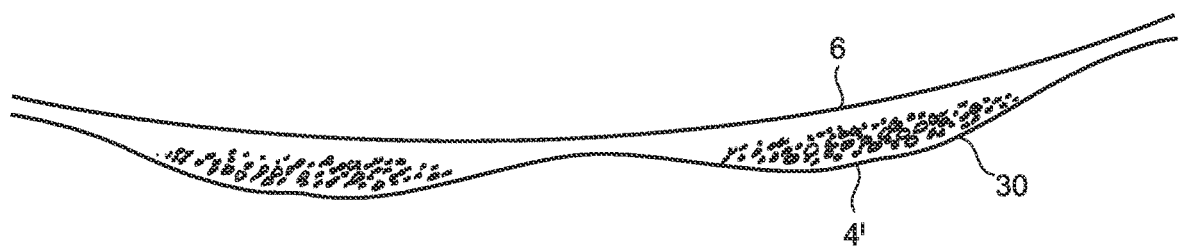
FIGS. 4A and 4B show the density of the foam at different points in the expansion process to produce the article illustrated in FIG. 3.
Figure 4B:
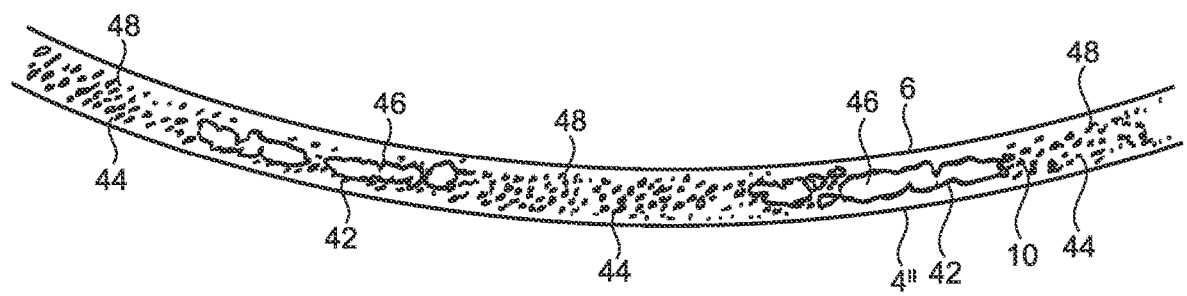

The density of the expanded cellular foam is lower than the density of the molten unexpanded plastic composition. As shown in FIG. 4A, in the ribs 30 of the injection moulded article, some cellular voids 22 are formed by expansion of the blowing agent in the large thickness regions, whereas in the valleys 34 of the injection moulded article there is substantially no expansion of the blowing agent in the small thickness regions. As shown in FIG. 4B, after opening the mould, the gas pressure remains evenly distributed for several seconds, maintaining a force against the outside skin 4", and therefore in the ribs 30 of the injection moulded article, the cellular voids 22 tend to grow and/or coalesce by further expansion of the residual blowing agent in the large thickness regions, whereas in the valleys 34 of the injection moulded article the expansion of the blowing agent is initiated in the small thickness regions 32.

The result is that, as shown in FIG. 4B, in the final expanded article 40 there are circumferentially alternating low density regions 42 and high density regions 44. The low density regions 42 correspond to the location of the ribs 30 and are associated with relatively large dimension cellular voids 46, whereas the high density regions 44 correspond to the location of the valleys 34 and are associated with relatively small dimension cellular voids 48. The average cell size is small, and the cell size is substantially uniform, in the high density regions 44, to provide a substantially homogeneous foam structure, whereas the average cell size is larger, and the cell size is less uniform, in the low density regions 42, to provide a less homogeneous foam structure. In FIG. 4B, it can be seen that the foam density is higher at the skins, and lower in the centre of the annular cross-section. FIG. 4B, also shows the alternating high and low density foam that relate to the low density in the ribs and the high density in the valley areas.

Figure 5:
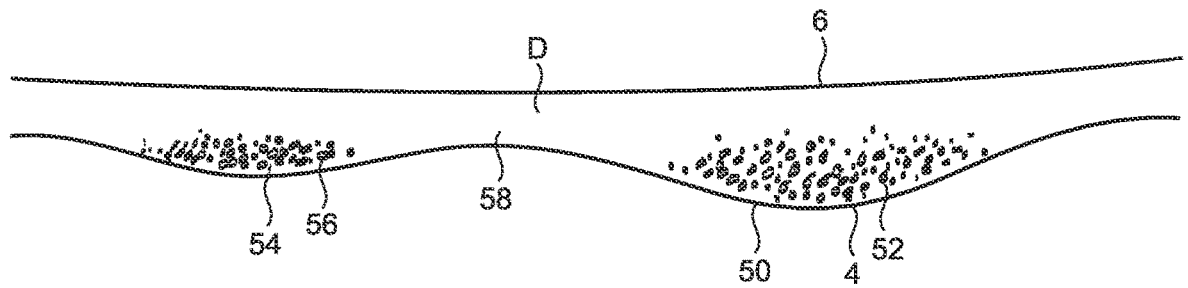
FIG. 5 illustrates the expansion of the molten plastic composition in the article shown in FIG. 3.

FIG. 5 illustrates that when the ribs have different heights, after injection moulding the thicker ribs 50 may have a larger number of cellular voids 52 and/or larger cellular voids 52 than the cellular voids 56 in the thinner ribs 54. In the vicinity of the valleys 58 there is a high concentration of blowing agent, for example $CO_2$ in solution. On opening the mould, thereby to leave the injection-moulded article on the core, the outer skin 4 above the valleys 58 expands rapidly as a result of the high blowing agent concentration, for example causing $CO_2$ to come out of solution and to form a gas. The tension holding the first and second skins 4, 6 together then decreases as the foam density reduces, as a result of the formation of cellular voids, and as pressure is exerted on the skins from gas released from the blowing agent in the molten plastic composition. The two skins are then pushed apart by the pressure exerted by the gas, and this pressure—along with the lower density of plastic composition at area D, which reduces the ability of the plastic composition at this point to restrain the first and second skins—then allows the first and second skins to also be pushed apart at the valley (area D) and form the fully-expanded article.

In a second aspect of the present invention, the first cavity-forming surface is such that a distance between the first cavity-forming surface and the second cavity-forming surface alternates between a first distance and a second distance around at least one first portion of the circumference of the region, the first distance being greater than the second distance; and each first portion is disposed between a pair of second portions of the circumference of the region, in which second portions a distance between the first cavity-forming surface and the second cavity-forming surface is a third distance which is less than the second distance. In step (d), the plastic composition between the first and second solid skins is allowed to solidify in said second portions, while the plastic composition between the first and second solid skins remains molten in said at least one first portion. In step (e), the mould is then opened and the plastic composition between the first and second solid skins in said at least one first portion is then allowed to expand by foaming. The foaming is a result of the pressure drop on opening the mould, and causing the blowing agent, for example $CO_2$, to come out of solution creating the expansion of the gas provided by the blowing agent. As discussed above, opening of the mould comprises removing the outer part of the mould so that the first solid skin is no longer in contact with the first cavity-forming surface, while maintaining the second solid skin in contact with the second cavity-forming surface.

Figure 6:
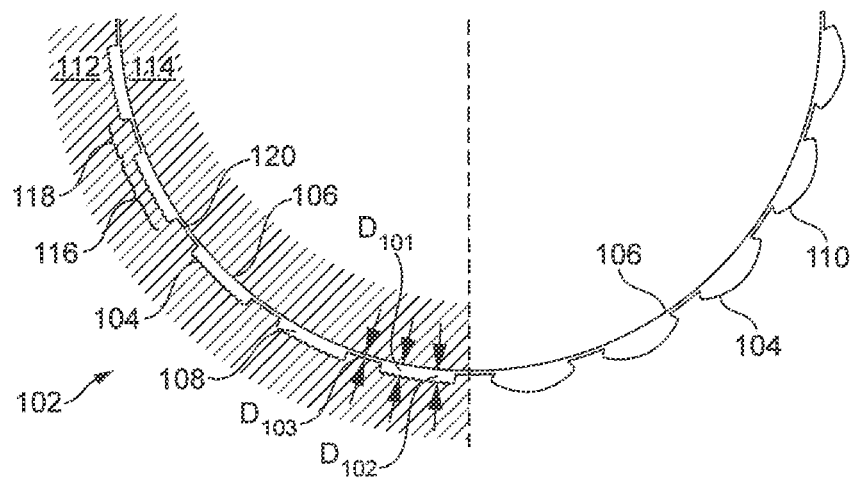
FIG. 6 shows a cross-section through a part of the article at the end of step (d) of one embodiment of the method of the second aspect of the present invention, wherein the left hand side of the Figure shows the article still within the mould, and the right hand side of the Figure shows the article when it has expanded and been removed from the mould.

FIG. 6 shows a cross-section through a part of the article 102 (for example, a coffee cup) illustrating the appearance of the article at different stages in the method of the second aspect of the present invention. The left-hand side of FIG. 6 shows the first solid skin 104, the second solid skin 106, the molten plastic composition 108 between the first and second solid skins 104, 106 in the first portions 116 of the circumference of the region, and the solidified 120 plastic composition between the first and second solid skins 104, 106, in the second portions 118 of the circumference of the region, at the end of step (d) of the method of the first aspect of the invention, when the article is still within the mould. FIG. 6 illustrates an embodiment where the first cavity forming surface of the outer part 112 of the mould comprises corrugations, the corrugations having peaks and troughs in the form of a sinusoidal wave. The inner part 114 of the mould is also shown. In this embodiment, the first distance $D_{101}$ and the second distance $D_{102}$ remain constant around the circumference of the region of the mould cavity which defines an annular cross-section of the cavity between outer and inner circumferential edges of the cavity. In the second portions 118, the third distance is shown as $D_{103}$. The distances between the first cavity-forming surface and the second cavity-forming surface are measured perpendicular to a tangent to the second cavity-forming surface.

The right-hand side of FIG. 6 shows the first solid skin 104, the second solid skin 106, and the plastic composition between the first and second solid skins 104, 106 in the first portions, which plastic composition 110 has expanded by foaming and solidified. In the right-hand side of FIG. 6, the article has been removed from the mould. As can be seen, the expansion has resulted in the valleys formed in the first solid skin 104 being "blown out" so that the first solid skin 104 is convex in the first portions 116 of the finished article.

At the end of step (d) in the method of the second aspect of the present invention, the areas where the distance between the first and second cavity-forming surfaces is the first distance $D_1$ (referred to henceforth as the "ribs") will store latent heat, and will be hotter than those areas where the distance between the first and second cavity-forming surfaces is the second distance $D_2$ (referred to henceforth as the "valleys"), as discussed above with reference to the first aspect of the present invention.

Figure 7:
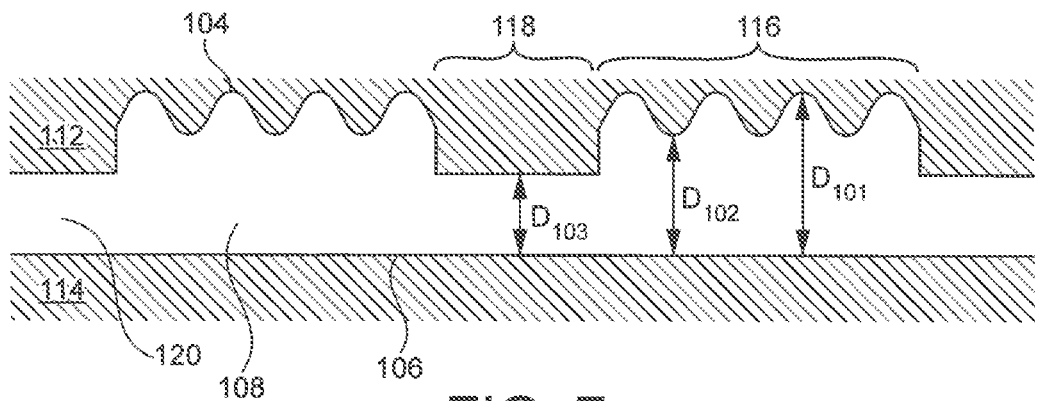
FIG. 7 shows two first portions 116 and three second portions 118 of the article at the end of step (d) of the second aspect of the present invention, when the article is still in the mould.

FIG. 7 shows two first portions 116 and three second portions 118 of the article at the end of step (d) of the second aspect of the present invention, when the article is still in the mould. The distances $D_{101}$, $D_{102}$ and $D_{103}$ can be seen more clearly in this Figure. In this embodiment, the first distance $D_{101}$ varies around the first portion 116 of the circumference of the region.

Figure 8:
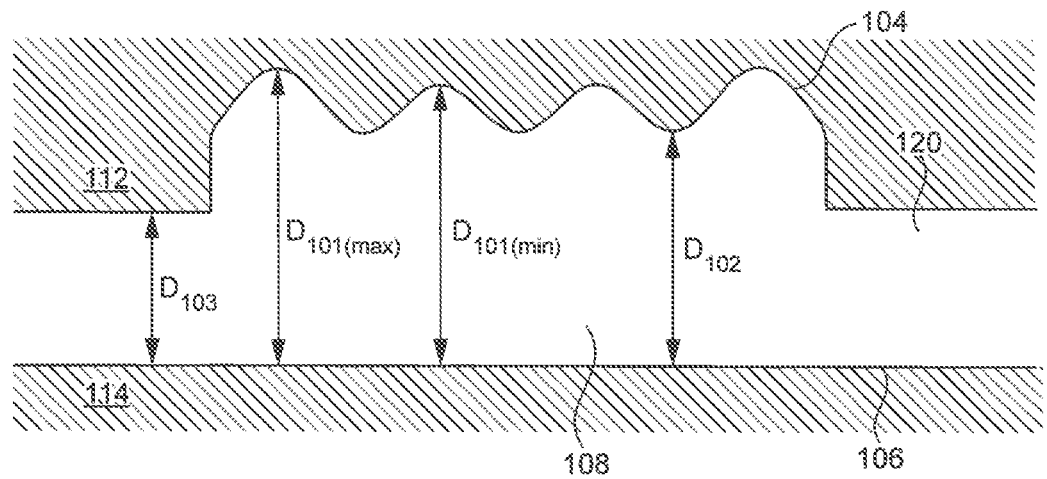
FIG. 8 shows a cross-section through a part of the article at the end of step (d) of one embodiment of the method of the second aspect of the present invention, when the article is still within the mould.

FIG. 8 shows a cross-section through a part of the article at the end of step (d) of one embodiment of the method of the second aspect of the present invention, when the article is still within the mould. As in FIG. 6, the first solid skin 104, the second solid skin 106 and the molten plastic composition 108 between the first and second solid skins 104, 106 of the first portion are shown, along with the solidified plastic composition 120 between the first and second solid skins 104, 106 of the second portions 118. In this embodiment, the first cavity forming surface of the outer part 112 of the mould again comprises corrugations in the first portion, the corrugations having peaks and troughs. However, in contrast to the embodiment shown in FIG. 6, the first distance $D_{101}$ varies around the first portion of the circumference of the region of the mould cavity which defines an annular cross-section of the cavity between outer and inner circumferential edges of the cavity. In particular, the first distance $D_{101}$ is at a maximum value $D_{101(max)}$ at the troughs of the first cavity-forming surface which are adjacent to the second portions 118, and the first distance reaches a minimum value $D_{101(min)}$ the pair of troughs which are midway between the troughs of the first cavity-forming surface at which the first distance is at the maximum value $D_{101(min)}$. Again, it is noted that a trough in the first cavity-forming surface of the mould results in a corresponding peak being formed in the article moulded therein, and vice-versa. In the embodiment shown in FIG. 8, the second distance $D_{102}$ remains constant around the circumference of the region of the mould cavity.

The expansion mechanism in step (e) of the first aspect of the invention, as discussed above regarding FIGS. 2A, 2B, 3, 4A, 4B and 5 is also applicable to the expansion mechanism in step (e) of the second aspect of the invention.

In both the first and second aspects of the present invention, the limit to the minimum thickness of the valleys (i e minimum value of $D_2$ which still allows for the first and second skins to be separated at the valleys following opening of the mould) is controlled by the tension between the first and second solid skins 4, 6 and the gas pressure in the expanding foam structure that separates the solidified surface skins. The parameters that influence the tension are:
 1. Temperature of the molten plastic composition
 2. Percentage of blowing agent (which is typically an endothermic blowing agent, but could be exothermic)/ or percentage and type of physical gas.
 3. Speed of injection into the mould at step (b).
 4. Injection pressure (higher pressure keeps more gas in solution and reduces premature foaming during injection).
 5. Cooling time.
 6. Mould temperature.
 7. Cell size in the foam.
 8. Additives present in the molten plastic composition.

A non-limiting example of parameters which can be selected for each of points 1 to 8, above, is given below. This example is purely illustrative of a particular embodiment, and is not limiting on the invention as a whole.
 1. The melt temperature of polypropylene is 165° C. However, chemical endothermic blowing agents generally need a higher temperature to activate the reaction. Also, the higher the temperature of the molten plastic composition, the smaller the second distance $D_2$ can be. For a composition where the polymer is polypropylene, melt temperatures of between 250° C. and 285° C. can be used in order to minimize the second distance $D_2$. The same temperature range of 250° C. to 285° C. may also be used in order to minimize the second distance $D_2$ when a physical gas is used rather than a chemical blowing agent.
 2. The blowing agent may be a chemical blowing agent or a physical blowing agent or any mixture of chemical and/or physical blowing agents. For example, the blowing agent may be a mixture of chemical blowing agents, for example a combination of endothermic and exothermic chemical blowing agents, or a combination of chemical and physical blowing agents, for example where the chemical blowing agent helps to nucleate a gas forming the physical blowing agent. Alternatively, the blowing agent may be a mixture of physical gases, for example a mixture of $CO_2$ and $N_2$, optionally in further combination with a chemical blowing agent. Chemical blowing agents for use in the present invention are preferably 50 to 60 wt % active level agents at a concentration of from 2 to 6 weight %, based on the weight of the molten plastic composition, or a comparable quantity of physical gas e.g. $CO_2$ or $N_2$ (a 60 wt % active level agent at a concentration of 2 weight % would give 1.2 wt % gas in the molten plastic composition, therefore the quantity of physical gas could be from 1 to 2 wt %). A physical gas such as nitrogen can easily and cheaply be added at any wt % within the range of 0.1 to 10 wt %), for example 6 wt %; higher concentrations of the physical gas tend to progressively increases the forces of the blowing agent outwardly against the skins.

3. Very fast injection speeds are preferred—for example, an injection rate of 50 grams per second per cavity is needed to ensure a filling time of less than 0.5 seconds; if the filling time is longer than this it will allow the solidified skin thickness to increase, thus reducing the thickness of the layer of molten plastic composition between the first and second solid skins 4, 6 at the end of step (d), and reducing the expansion effects.

4. The cooling time within the mould before opening in step (e) should also be minimised: however, this is limited by the time it takes to reduce the locking force of the injection moulding machine before opening the mould. Typically the time taken to reduce the locking force is 0.2 to 0.5 seconds; unless other special mechanisms are used, this parameter defines the minimum time before the mould halves can start to move apart allowing the first and second skins to start to move away from each other.

5. The mould temperature affects the solid skin thickness. To slow down the skin solidification speed for a polypropylene cup-type product, the inner part of the mould is preferably at 40° C. to 70° C. Too high a temperature would cause the second solid skin to deform, which may be undesirable. The outer part of the mould is preferably at 50° C. to 120° C. in order to keep the first skin soft enough to deform.

6. Cell size in the expanded foam is preferably maximized: a fine cell structure has a greater melt strength preventing skin separation. When the pressure of the molten plastic composition reduces due to its flow into the expanded low pressure adjoining area, the cell size increases. Larger cells have thinner skins and therefore a lower melt strength. The cell size in the first and second skins should be from 0 to 100 μm (micrometres), and the cell size in the expanded composition between the skins will be 50 to 250 μm or 100 to 500 μm or 250 to 1000 μm, or there could be a void between the first and second skins.

7. Additives can be used to further influence the minimum value of the second distance $D_2$. For example, chalk (calcium carbonate) will hold heat for longer than polypropylene, and thus its inclusion will help to slow down the skin solidification. Mica, due to its sharp edged platelets, will prevent bubbles from being formed, thereby breaking the adhesion between the skins by creating a void.

As described above, typically the sinusoidal configuration for the peaks and troughs in the injection moulded intermediate article has smooth curvature. In alternative configurations, the peaks and/or troughs may have shallow angles, for example forming a 'V' shape, and small radii of curvature; however such small radii would tend to resist being "pulled" out and leave vertical ridges in the wall of the cup.

In some embodiments, it may be desired to have a series of ridges running vertically up the cup wall and this may avoid any stretching of the outer skin. This can be achieved by reducing the % of blowing agent and/or increasing the cooling time, which would tend to reduce the effect of the blowing, and thereby achieve a partially blown cup, with the valleys not fully blow out to the height of the peaks.

In some embodiments of the first and second aspects of the present invention, in step (e), the first circumferential length remains substantially constant as compared to the first circumferential length at the end of step (d). In some embodiments, the second circumferential length remains substantially constant as compared to the second circumferential length at the end of step (d). In some embodiments, both the first and second circumferential lengths remain substantially constant as compared to the first and second circumferential lengths at the end of step (d). By "substantially constant" in this context, it is meant that the particular circumferential length increases by up to 2% as compared to that circumferential length at the end of step (d).

In other embodiments of the first and second aspects, in step (e), the first circumferential length increases by up to 20%, up to 10%, or up to 5% as compared to the first circumferential length at the end of step (d). In certain embodiments, the first circumferential length increases by 12 to 20%, optionally 8 to 15%, as compared to the first circumferential length at the end of step (d); alternatively by 3 to 10% or 1 to 5% as compared to the first circumferential length at the end of step (d).

In some embodiments of either the first or second aspect of the invention, a pattern can be embossed into the first solid skin of the article during the method, and/or an external sleeve (which may be decorative) can be formed on the outer surface, i.e. the first solid skin, of the article during the method. The pattern and/or decoration may be, for example, a corporate logo. In such embodiments, step (e) further comprises, after removal of the outer part of the mould, inserting the article into a second mould before expansion of the plastic composition between the first and second skins (in said at least one first portion, in the second aspect) is complete, and retaining the article in the second mould until the plastic composition between the first and second skins has solidified (in said at least one first portion, in the second aspect). In the first aspect, when expansion of the plastic composition between the first and second skins is complete, the first solid skin of the article is in contact with a surface of the second mould. In the second aspect, when expansion of the plastic composition between the first and second skins in said at least one first portion is complete, the first solid skin of the article is in contact with a surface of the second mould in said at least one first portion.

When it is desired to emboss a three-dimensional pattern into the outer surface of the article, the surface of the second mould may comprise a three-dimensional pattern. This pattern is then imparted to the first solid skin when it is forced into contact with the surface of the second mould upon expansion of the plastic composition between the first and second solid skins. When the plastic composition comprises polypropylene, the second mould would typically be heated to a temperature within a range of from 80 to 150° C. to deform the outer solid skin by embossing.

When it is desired to include a label on the outer surface of the article, then at least part of the surface of the second mould may be covered with a film sheet prior to inserting the article into the second mould. If it is desired to cover the outer surface of the article with a sleeve, then the film sheet may cover an entire circumference of at least part of the surface of the second mould. For example, in the finished article, the sleeve could cover an entire circumference of the article over only a part of the height of the article (e.g. a wide band of the sleeve material around the mid-point of the article's height), or could cover an entire circumference of the article over the entire height of the article (with the exception of a rim area). In the first aspect of the invention, at least part of the first solid skin of the article will be forced into contact with the film sheet upon expansion of the plastic composition between the first and second solid skins. In the second aspect of the invention, at least part of the first solid skin of the article will be forced into contact with the film sheet in said at least one first portion upon expansion of the plastic composition between the first and second solid skins. The first solid skin may also be in contact with the film sheet in said at least one second portion. In both aspects, the outer surface (first solid skin) of the article bonds to the film sheet upon being forced into contact therewith by the expansion of the plastic composition between the first and second skins of the article. Again, the surface of the second mould could include a three-dimensional pattern, as above. The film sheet could comprise plastics and/or paper. However, polypropylene (e.g. oriented polypropylene) is preferred as it is compatible with recycling. A foamed plastic (e.g. polypropylene) could also be used as the film sheet, in order to provide added insulation to the article and to provide a more tactile surface for gripping of the article. A label may typically be placed into the mould cavity and forced into the corrugations together with the injected plastic, and the label would then follow the contour of the outer skin.

In those embodiments wherein the article is inserted into a second mould before expansion of the plastic composition between the first and second skins is complete, the second skin of the article remains in contact with the second cavity-forming surface of the original mould, and the second mould is moved so as to be placed over the first skin of the article. The second mould could be moved by way of a robotic device e.g. a robotic arm. When expansion of the plastic composition between the first and second skins is complete and the first solid skin is in contact with the surface of the second mould (or the film sheet which covers at least part of the surface of the second mould), the article may then be released from the second cavity-forming surface of the original mould and retained in the second mould. The second mould may then be moved by the robotic device to take the articles for stacking.

In any embodiments of either of the above aspects of the present invention, the polymer of the plastic composition may comprise a polyolefin or blend of a plurality of polyolefins, optionally polyethylene or polypropylene; or a polyester, optionally polyethylene terephthalate or polybutylene terephthalate; or polylactic acid. In one embodiment, the polymer comprises polypropylene. Polypropylenes having a Melt Flow Index (MFI) of from 10 to 120 are particularly preferred. The Melt Flow Index of a polymer can be measured according to ASTM D1238.

Blowing agents which can be used in any embodiments of either of the above aspects of the present invention include chemical blowing agents (which decompose under the conditions of the methods, thus liberating gases into the molten plastic composition, which gases can subsequently expand upon release of pressure on the plastic composition, e.g. opening the mould, causing the plastic composition to foam and expand). Examples of such chemical blowing agents include Hydrocerol® (from Clariant) and TecoCell® (from Trexel). The blowing agent is typically endothermic, but exothermic blowing agents could also be used. Alternatively, the blowing agent could be a physical blowing agent in the form of a gas dissolved in the molten plastic composition. Such a gas may comprise, for example, carbon dioxide or nitrogen. The gas may optionally further include a perfume composition (i.e. a scent) which remains present in the polymer material after expansion, to enhance the consumer experience. The blowing agent may be a chemical blowing agent or a physical blowing agent or any mixture of chemical and/or physical blowing agents. For example, the blowing agent may be a mixture of chemical blowing agents, for example a combination of endothermic and exothermic chemical blowing agents, or a combination of chemical and physical blowing agents, for example where the chemical blowing agent helps to nucleate a gas forming the physical blowing agent. Alternatively, the blowing agent may be a mixture of physical gases, for example a mixture of $CO_2$ and $N_2$, optionally in further combination with a chemical blowing agent.

When using carbon dioxide as the blowing agent, $CO_2$ gas is produced by the blowing agent in the extruder of the injection moulding machine, and the $CO_2$ gas then goes into solution during the injection phase (typically from 300 to 500 bar) due to the relatively high pressure exerted on the material being greater than the pressure required (typically less than 100 bar) to force $CO_2$ into solution within molten thermoplastic resin, such as polypropylene. When nitrogen is used as the blowing agent, the nitrogen does not go into solution within molten polypropylene, since nitrogen gas requires over 3,000 bar to force it into partial solution into molten polypropylene.

In some embodiments of the first and second aspects of the present invention, the molten plastic composition includes a filler. Fillers may act to add strength to the article, increase its thermal conductivity, or raise the heat distortion temperature of the article. In certain embodiments, the filler is chalk or calcium carbonate.

In both the first and second aspects of the present invention, the article may be a cup or container, e.g. a coffee cup or a container suitable for warming soup in a microwave. The articles may be disposable.

A further embodiment of a hollow container produced according to the present invention is further described below with reference to FIGS. 9 to 14. In this embodiment, a coffee cup, i.e. a cup suitable for holding hot beverages such as coffee, was manufactured according to the present invention. In this embodiment, the coffee cup has a capacity of 16 fluid ounces. However, the hollow container may be used, or shaped and dimensioned fur use, as a container for food.

Figure 9:
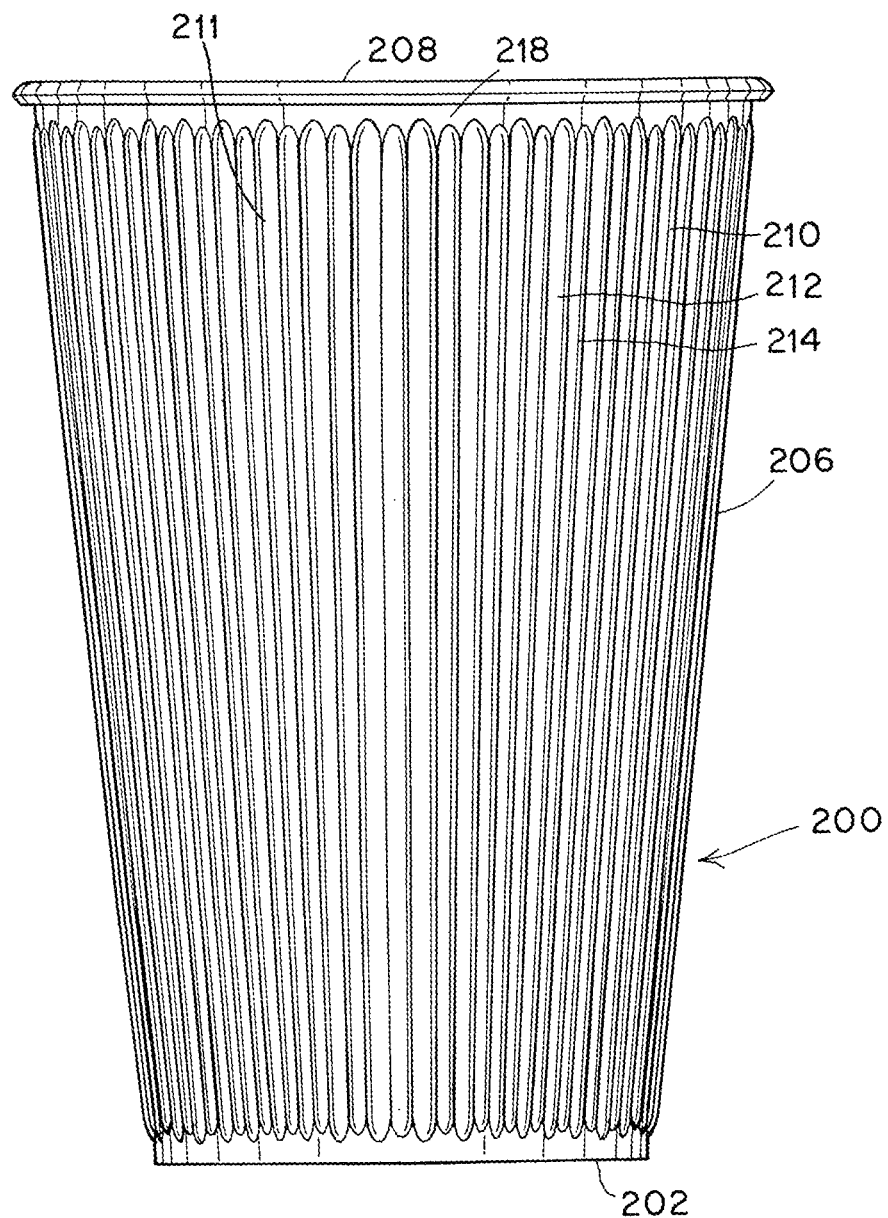
FIG. 9 is a side view of an injection moulded preform for a cup formed according to a method of a further embodiment of the present invention.
Figure 10:
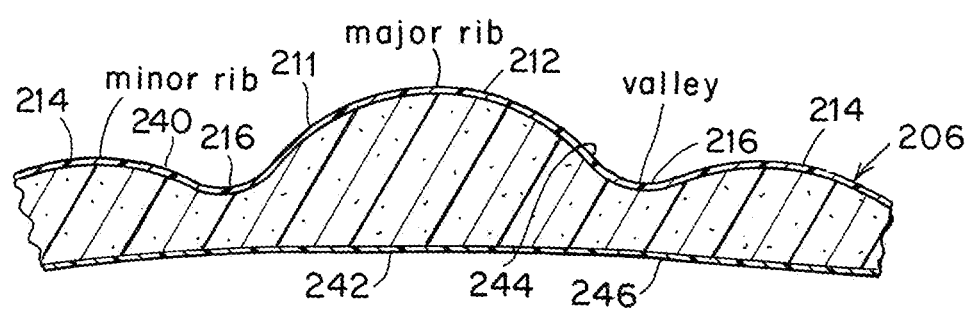
FIG. 10 is a cross-section though a sidewall of the injection moulded preform of FIG. 9.
Figure 11:
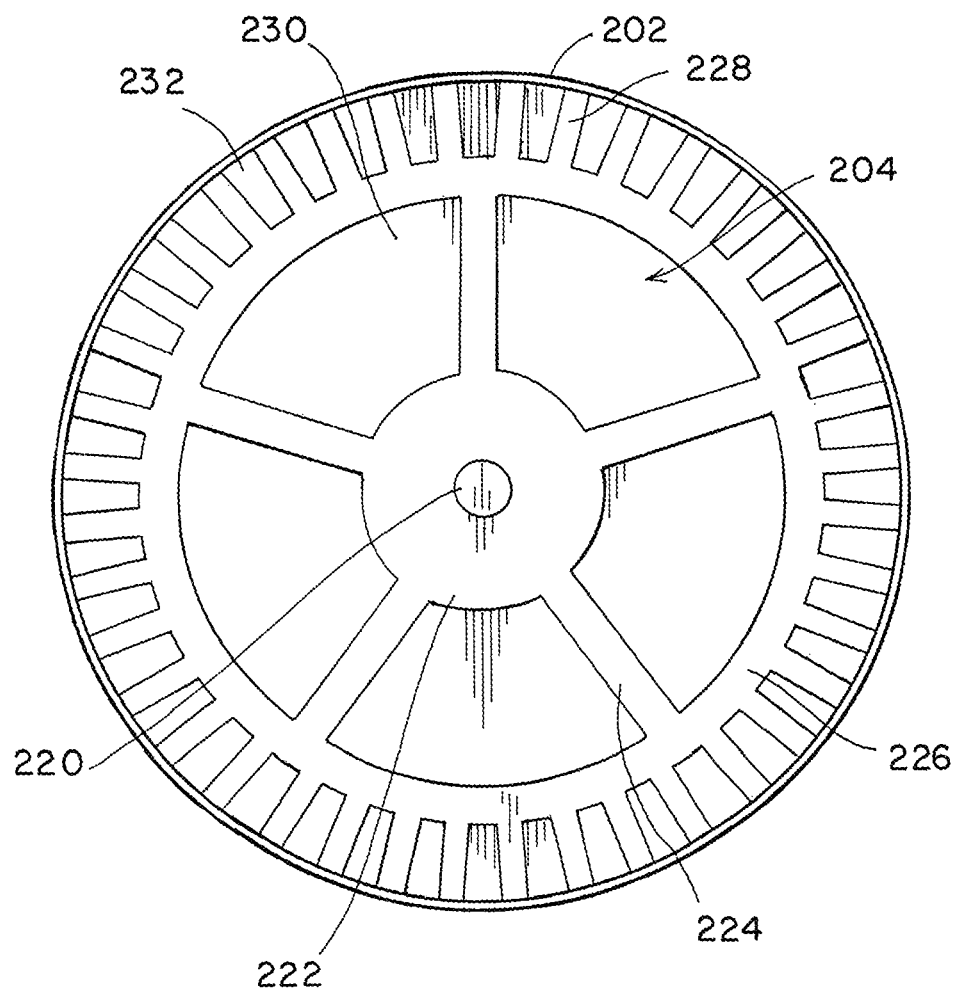
FIG. 11 is a bottom view of the base of the injection moulded preform of FIG. 9.

Initially in accordance with the present invention, a cup-like preform 200, as shown in FIGS. 9 to 11, is injection moulded from a thermoplastic resin comprising a blowing agent, in this example polypropylene and a carbon dioxide ($CO_2$) blowing agent. In the preform 200, the polypropylene includes non-foamed regions in which carbon dioxide ($CO_2$) gas is in solution in the polypropylene after the injection moulding process and expanded cellular foamed regions in which the carbon dioxide ($CO_2$) gas has come out of solution in the polypropylene during the injection moulding process, and has thereby formed cellular foam regions. However, any other suitable blowing agent and thermoplastic resin combination may be employed. The blowing agent forms foamed areas in the preform as a result of localised expansion of the thermoplastic resin in a low pressure region of the injection mould.

The cup-like preform 200 is injection moulded so as to have an annular foot 202 which comprises unfoamed thermoplastic resin. Above the annular foot 202 is a circular base wall 204, shown in detail in FIG. 11.

The annular sidewall 206 extends upwardly away from the annular foot 202 and circular base wall 204 to terminate in an annular top rim 208.

The cup-like preform 200 had a height of 135 mm, a top rim diameter of 90 mm and a base diameter of 55 mm. The annular foot 202 had a height of about 2 mm. The thermoplastic material of the cup-like preform 200 had an unexpanded volume (i.e. the material volume of the injection-moulded preform prior to further expansion to form the final cup) of 26 $cm^3$. The thermoplastic material of the cup-like preform 200 had an average moulded density of 0.9 g/cm³ and a weight of 24 grams. The annular sidewall 206 had an average length L/thickness T ratio of 180:1, where L is the length of the sidewall 206 along the height of the sidewall 206 and T is the sidewall thickness. Lower L/T ratios of less than 180:1 can be used. However, lower L/T ratios imply a higher wall thickness for a given cup height and tend to increase the weight of the cup and reduce the filling pressure, allowing the blowing agent to come out of solution during injection.

As shown in FIG. 9, the annular sidewall 206 comprises a plurality of longitudinal ribs 210 extending radially outwardly from the outer surface 211 of the annular sidewall 206. The longitudinal ribs 210 comprise alternating thick, or major, ribs 212 and thin, or minor, ribs 214. FIG. 10 is an enlarged cross-section through the annular sidewall 206. The thick ribs 212 and thin ribs 214 comprises cellular foamed thermoplastic material, and between the longitudinal ribs 210 are valleys 216 which comprise unfoamed thermoplastic material. The valleys 216 have a width, in a circumferential direction around the annular sidewall 206, from 0.3 to 1.0 mm in order to provide an unexpanded region, i.e. the valleys 216, between expanded regions, i.e. the ribs 210. The valleys 216 of unfoamed thermoplastic material typically have a width, in a circumferential direction around the annular sidewall 206, of about 1 mm.

During the injection moulding process, in the locations of the longitudinal ribs 210 the thermoplastic material has been subjected a reduced pressure, as a result of the correspondingly thick regions of the moulding cavity, which has enabled the blowing agent to come out of solution and form a gas so as to form the expanded cellular foam within the injection mould. In contrast, during the injection moulding process, in the locations of the valleys 216 between the longitudinal ribs 210 the thermoplastic material has been subjected a high pressure, as a result of the correspondingly thin regions of the moulding cavity, which has prevented the blowing agent from coming out of solution, thereby preventing expansion of the thermoplastic material within the injection mould.

Similarly, the annular top rim 208 is formed of expanded cellular foam within the injection mould and an annular transition zone 218 between the annular top rim 208 and the upper ends of the longitudinal ribs 210 and valleys 216 is formed of unexpanded thermoplastic material, since the annular top rim 208 is relatively thick whereas the annular transition zone 218 is relatively thin. In addition, the relatively thin annular foot 202 is formed of unexpanded thermoplastic material.

FIG. 11 shows the circular base wall 204. The base wall 204 has a central gate 220 which comprises the injection point for the injection moulding. The central gate 220 is surrounded by a first annular thick section 222. A plurality of primary flow leaders 224, in the illustrated embodiment there are five primary flow leaders 224 but any suitable number may be provided, extend radially outwardly from the first annular thick section 222. The primary flow leaders 224 terminate at a second annular thick section 226. A plurality of secondary flow leaders 228, in the illustrated embodiment there are forty secondary flow leaders 228 but any suitable number may be provided, extend radially outwardly from the second annular thick section 226. The secondary flow leaders 228 each terminate at a lower end of a respective thin rib 214. The number of secondary flow leaders 228 corresponds to the number of thin ribs 214, and also corresponds to the number of thick ribs 212 which are respectively alternately located between adjacent thin ribs 214.

The first annular thick section 222, the primary flow leaders 224, the second annular thick section 226 and the secondary flow leaders 228 have a thickness such that, as explained above for the longitudinal ribs 210, these elements are composed of expanded cellular foam within the injection mould. Typically, these elements have a thickness of from 0.5 to 1.0 mm, for example about 0.6 mm. In contrast, there are first segments 230 between the primary flow leaders 224 and second segments 232 between the secondary flow leaders 228 which have a thickness such that, as explained above for the valleys 216, these elements are composed of unexpanded thermoplastic material. Typically, these elements have a thickness of from 0.2 to less than 0.5 mm, for example about 0.3 mm.

The dimensions, namely the thickness and width (respectively perpendicular and parallel to the plane of the circular base wall 204) of the first annular thick section 222, the primary flow leaders 224, the second annular thick section 226 and the secondary flow leaders 228 are selected so that during the injection moulding the thermoplastic material can readily flow away from the central gate 220 to permit easy material flow to reduce the filling pressure and assist fast injection. The thickness of the first annular thick section 222, the primary flow leaders 224, the second annular thick section 226 and the secondary flow leaders 228 is set by the injection moulding and the resultant expanded cellular foam has a thickness which is less than the height (typically 2 mm) of the annular foot 202. This ensures that the resultant cup can be stood securely on a flat surface around the circumference of the annular foot 202 and the expanded cellular foam regions in the circular base wall 204 do not extend below the bottom edge of the annular foot 202 and thereby impede the cup from standing securely and reliably on a flat surface.

In the photographs of FIGS. 9 to 11, the unexpanded areas appear translucent to the naked eye, since the blowing agent, in this embodiment $CO_2$ gas, stays in solution. However, if a pigment is incorporated into the thermoplastic material, the unexpanded areas typically appear opaque, with a solid colour. The foamed areas typically appear to have a pastel colour due to the white background created by the expanded cellular foam. In FIGS. 9 to 11, it should be noted that cell sizes of less than 0.5 microns are not visible to the naked eye.

As described hereinabove, the injection moulding forms outer and inner solid skins 240, 242 at the outer and inner surfaces 244, 246 of the preform 200, but the cooling time within the mould is minimized so that a molten thermoplastic resin is retained between the outer and inner solid skins 240, 242. After the injection moulding, the mould is opened and the preform 200 is removed from the outer moulding element, as described hereinabove, before the thermoplastic resin between the inner and outer skins 240, 242 has solidified. Removal of the preform 200 from the outer moulding element reduces the pressure on the outer surface 244 of the preform 200, which permits the blowing agent in the unexpanded regions of the thermoplastic material to come out of solution and form a gas so as to form the expanded cellular foam externally of the injection mould.

In an alternative embodiment, all of the longitudinal ribs 210 have the same dimensions. In further alternative embodiments, the longitudinal ribs 210 and valleys 216 can have independently varying dimensions.

Figure 12:
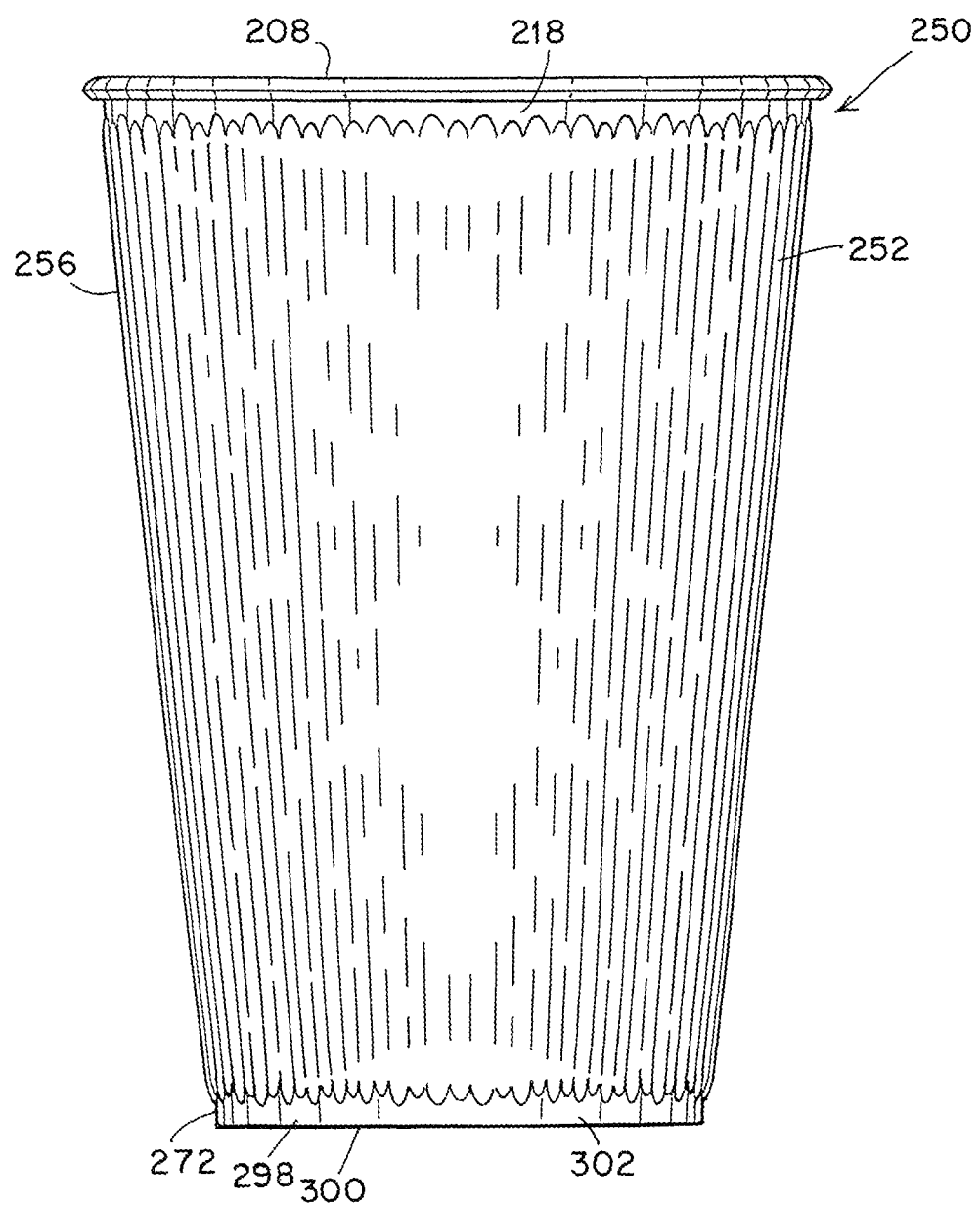
FIG. 12 is a side view of a cup formed by expansion of the injection moulded preform of FIG. 9.
Figure 13:
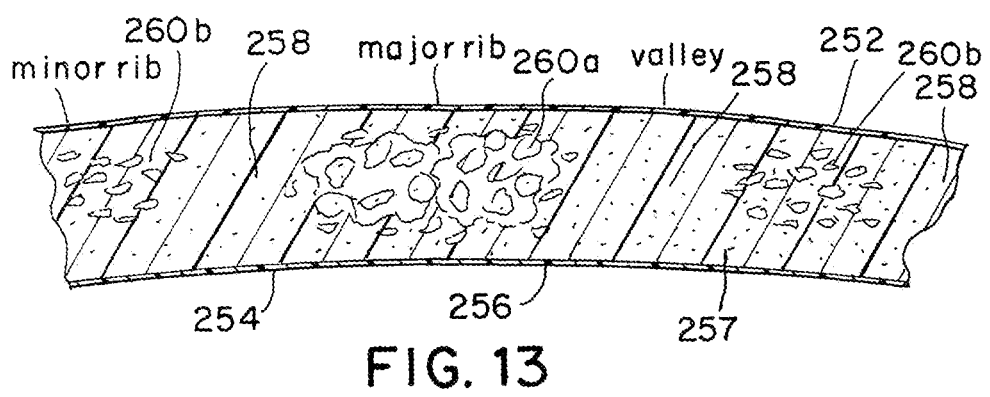
FIG. 13 is a cross-section though a sidewall of the cup of FIG. 12.
Figure 14:
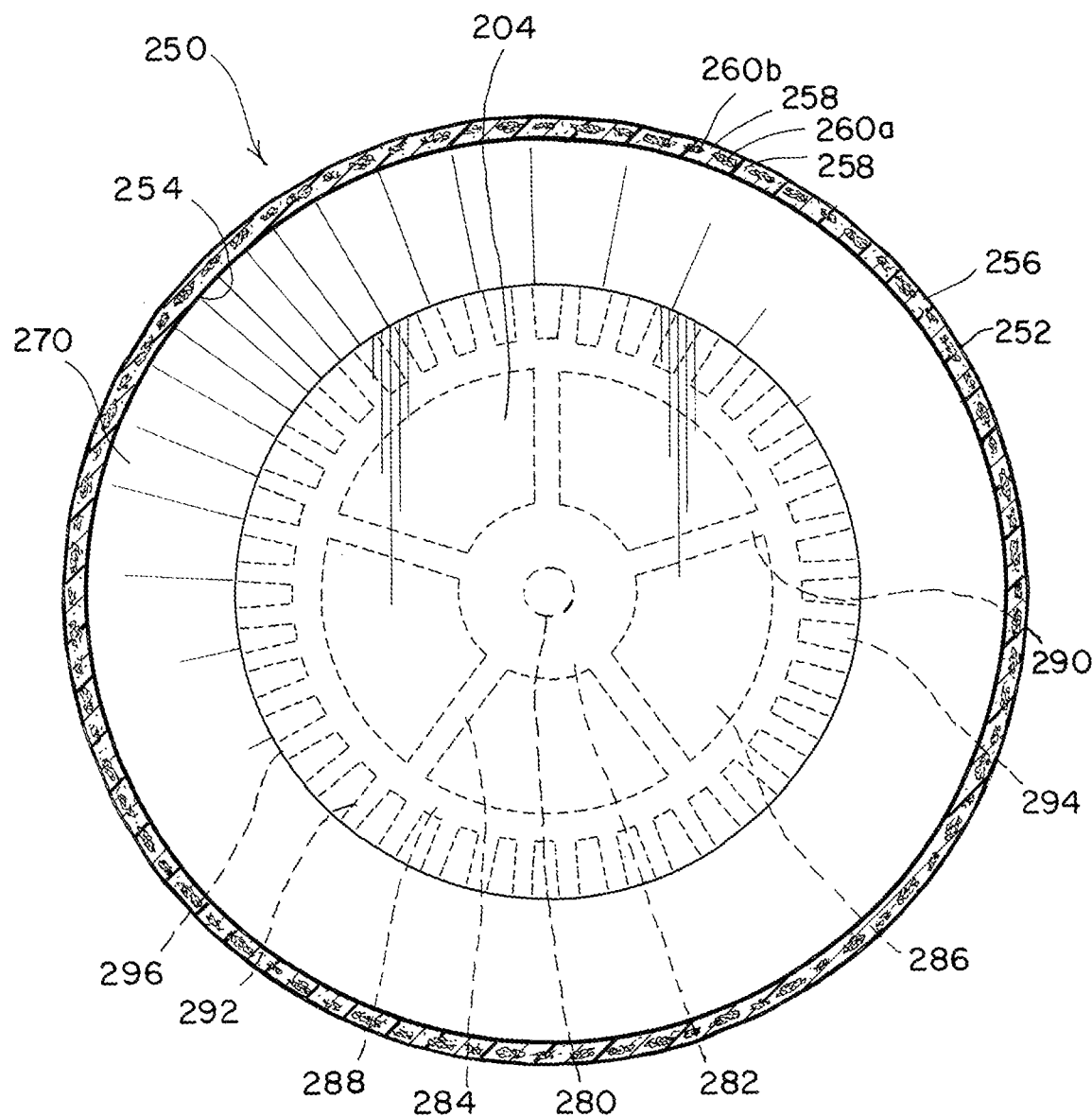
FIG. 14 is a top view through a transverse cross-section of the cup of FIG. 12.

The resultant cup structure is shown in FIGS. 12 to 14. The cup 250 is a hollow article for use as a beverage cup and has an annular sidewall 256 and a base wall 204 defining a central hollow cavity 270. The cup 250 has a top rim 208, comprises of expanded cellular foam, of the sidewall 256 and a bottom end 272 of the sidewall 256. The sidewall 256 is an integral annular moulding, and most preferably the annular sidewall 2567, base wall 204, top rim 208 and bottom end 272 are an integral annular moulding. The hollow article is composed of a single plastics material, optionally a thermoplastic. Typically, the hollow article is a beverage cup or food container composed of a single recyclable thermoplastic material, optionally wherein the thermoplastic material is a polymer which comprises a polyolefin or blend of a plurality of polyolefins, further optionally polyethylene or polypropylene; or a polyester, further optionally polyethylene terephthalate or polybutylene terephthalate; or polylactic acid. Preferably, the hollow article is a coffee cup which is thermally stable up to a temperature of at least 75° C.

The annular sidewall 256 comprises a plastics material composed of a sandwich structure of inner and outer skins 254, 252 and an expanded cellular foam layer 257 therebetween. The top rim 208 is separated from an upper edge of the sandwich structure by an annular ring 218 of the plastics material which is unexpanded. The expanded cellular foam layer 257 comprises an annular array of reinforcing areas 258 extending longitudinally along the sidewall 256 in a direction between the top rim 208 and the bottom end 272. The reinforcing areas 258 are mutually separated by an annular array of spacer regions 260 extending longitudinally along the sidewall 256 in a direction between the top rim 208 and the bottom end 272 to provide alternating reinforcing areas 258 and spacer regions 260 around the annular sidewall 256. The reinforcing areas 258 comprise expanded cellular foam of a first density and the spacer regions 260 comprise expanded cellular foam of a second density, wherein the first density is higher than the second density. The expanded cellular foam in the reinforcing areas 258 typically has a lower concentration of cellular voids than the expanded cellular foam in the spacer regions 260; and/or a more uniform size distribution of cellular voids than the expanded cellular foam in the spacer regions 260; and/or a smaller average size of cellular voids than the expanded cellular foam in the spacer regions 260.

In the resultant cup 250, the low-density expanded foam has remained in the major and minor ribs 212, 214 which were present in the preform 200. The valleys 216 of the preform 200 are expanded from the valley floor, defined by the outer solid skin 240 of the valley 216, to a point higher than the adjacent major and minor ribs 212, 214. However, surprisingly a higher density foam is created between the major and minor ribs 212, which is believed to have a high density because no foam expansion during preforming has taken place in the valleys 216.

In the circular base wall 204 of the preform, the structure is substantially retained in the final cup base, although there may be some minor expansion of the previously unexpanded regions. The annular transition zone 218 between the annular top rim 208 and the upper ends of the longitudinal ribs 210 and valleys 216 remains composed of unexpanded thermoplastic material in the cup 250.

As shown in particular in FIG. 13, the resultant cup has a slightly undulating outer circumferential surface 252 and substantially smooth inner circumferential surface 254 for the sidewall 256. The sidewall 256 comprises expanded cellular foam 257. The outer circumferential surface 252 has slightly higher surfaces at the location of the valleys 216 of the preform 200. However, optimization of the blowing agent concentration, cooling time and preform temperature on removal from the injection mould can be manipulated to achieve a substantially smooth outer circumferential surface 252.

As also described above with reference to FIG. 5, the foam density varies around the circumference of the sidewall 256, alternating between relatively high density areas 258, constituting the reinforcing areas 258, corresponding to the location of the valleys 216 of the preform 200, and relatively low density areas 260, constituting the spacer regions 260, corresponding to the location of the longitudinal ribs 210 of the preform 200. The alternating reinforcing areas 258 and spacer regions 260 around the annular sidewall 256 provide that each reinforcing area 258 is located between opposite spacer regions 260 and each spacer region 260 is located between opposite reinforcing areas 258.

The low density areas 260 comprise first low density areas 260a corresponding to the location of the major longitudinal ribs 212 of the preform 200 and second low density areas 260b corresponding to the location of the minor longitudinal ribs 214 of the preform 200, with the foam density being slightly higher in the second low density areas 260b than in the first low density areas 260a, but in each case the foam density is lower than in the relatively high density areas 258, corresponding to the location of the valleys 216. In the alternative embodiment where the longitudinal ribs 210 have the same dimensions, the low density areas 260 have the same dimensions and properties and alternate with the high density areas 258.

The spacer regions 260 comprise first and second spacer regions 260a, 260b, the first spacer regions 260a having a greater width, in a circumferential direction around the annular sidewall 256, than the second spacer regions 260b. The first and second spacer regions 260a, 260b comprise expanded cellular foam, and the expanded cellular foam of the first spacer regions 260a has a lower density than the expanded cellular foam of the second spacer regions 260b. The first and second spacer regions 260a, 260b alternate around the annular sidewall 256. The alternating reinforcing areas 258 and first and second spacer regions 260a, 260b around the annular sidewall provide a repeating sequence of a reinforcing area 258, a first spacer region 260a, a reinforcing area 258, and a second spacer region 260b.

The reinforcing areas 258 have a width, in a circumferential direction around the annular sidewall, of from 0.5 to 3 mm, optionally from 0.75 to 2 mm. The spacer regions 260 have a width, in a circumferential direction around the annular sidewall, of from 0.5 to 10 mm optionally from 0.5 to 4 mm, further optionally from 0.75 to 3 mm. The sidewall has a thickness of from 0.5 to 4 mm, optionally from 1 to 3 mm.

As described above, in the circular base wall 204 of the preform, the structure is substantially retained in the final cup base, although there may be some minor expansion of the previously unexpanded regions. Therefore in the hollow article or cup 250, the base wall 204 comprises a central gate region 280, a first annular ring 282 of expanded cellular foam surrounding the gate region 280, and a plurality of first radial elements 284 of expanded cellular foam extending radially outwardly towards the sidewall 256. The first radial elements 284 are mutually separated by first segments 286 of unexpanded plastics material. The base wall 204 further comprises a second annular ring 288 of expanded cellular foam surrounding, and connecting with the radially outer ends 290 of, the plurality of first radial elements 284, and a plurality of second radial elements 292 of expanded cellular foam extending radially outwardly towards the sidewall 256. The second radial elements 292 are mutually separated by second segments 294 of unexpanded plastics material. The radially outer ends 296 of the plurality of second radial elements 294 of expanded cellular foam connect with the sidewall 256, in particular connect with a respective spacer region 260, typically the first spacer region 260*a*, in the sidewall 256.

The unexpanded plastics material in the base wall 204 typically has a thickness of from 0.25 to 0.75 mm, optionally from 0.25 to 0.5 mm. The expanded cellular foam of plastics material in the base wall 204 typically has a thickness of from 0.5 to 1.75 mm, optionally from 0.5 to 1.25 mm.

The hollow article 250 further comprises at least one foot 298 which extends downwardly from the bottom end 272 of the sidewall 256 and defines at least one lower surface 300 which is located lower than a bottom surface 302 of the base wall 204. Preferably, the at least one foot 298 comprises a single annular foot 298 having a single annular lower surface 300 and comprises unexpanded plastics material which is integrally moulded with the sidewall 256 and the base wall 204 and has a height of from 1.5 to 4 mm, optionally from 1.75 to 3 mm.

The alternating and repeating foam density around the cup 250 is shown in FIGS. 13 and 14. The resulting foam structure, of alternating high/low density expanded cellular foam areas around the cup circumference, provides a high load capacity of the cup when loaded in a longitudinal direction; in other words, the cup has a high resistance to being crushed by a force applied along the longitudinal axis of the cup. The alternating high/low density expanded cellular foam areas extend longitudinally along the sidewall, so that the high density areas 258 constitute longitudinal reinforcing ribs separated by longitudinal lower density foam areas 260*a*, 260*b*. This longitudinal crush strength is substantially doubled as compared to a foam side wall of a corresponding thickness but with a constant foam density around the cup circumference. The cup also has very high flexural stiffness and very high hoop stiffness in the sidewall, which is achieved with a significantly reduced mass of thermoplastic material as compared to cup sidewalls of unfoamed thermoplastic material of corresponding structural properties. In short, the foamed cup of the present invention can provide high structural strength to a sidewall using a minimum amount of thermoplastic material in a cup which can be formed from a single thermoplastic material.

The rigidity of the cup formed using the preferred embodiments of the present invention is far superior to any other limited-use cup currently in the market. The cup typically comprises a thermoplastic polymer which can have high crystallinity in both the foamed and unfoamed portions, and therefore has high thermal stability. The preferred cup of the present invention is therefore dishwasher-safe and microwave-safe, and can exhibit unlimited reuse.

The present invention can provide a high strength hollow article with a high ratio of volume to weight. For example, a ratio between the volume of the central hollow cavity, in $cm^3$, and the mass of the hollow article, in g, is from 2 to 3.

The thermoplastic material of the cup 250 of the illustrated embodiment has an expanded volume (i.e. the material volume of the final cup) of 55.6 $cm^3$ and, compared to the preform which has an unexpanded volume of 26 $cm^3$, this represents an expansion of about 110% between the cup and the preform which occurs outside the injection mould as a result of significant expansion circumferentially outwardly of the valleys 216, and reduced expansion circumferentially outwardly of the longitudinal ribs 210 to form the foam sidewall 256 of the cup 250.

Typically, the volumetric change from the intermediate preformed cup to the final fully expanded cup is about 2.1:1, but this ratio can readily be varied by design and process control to be within the range of from 1.5:1 to 3:1.

In the illustrated embodiment of FIGS. 9 to 14 a typical coffee cup is formed. However, the present invention may be employed to produce a hollow container having a height as low as about 10 mm, for example forming a tray, or a wide-mouth container such as a tub, for example a tub for hot or cold foodstuffs, e.g. takeaway food, cook-chill food or ready to eat food.

Various modifications to the illustrated embodiments will be apparent to those skilled in the art and are intended to be included within the scope of the present invention.

The invention claimed is:

1. A hollow article for use as a beverage cup, or as a container, the hollow article having an annular sidewall and a base wall defining a central hollow cavity, a top rim of the sidewall and a bottom end of the sidewall, wherein the annular sidewall, base wall, top rim and bottom end are an integral moulding and the hollow article is composed of a single thermoplastic material, wherein the annular sidewall extends upwardly away from the base wall and terminates in the top rim and the annular sidewall has a substantially smooth inner circumferential surface, wherein the annular sidewall comprises a plastics material composed of a sandwich structure of inner and outer skins and an expanded cellular foam layer therebetween, wherein the expanded cellular foam layer in the sidewall extends upwardly away from the base wall and comprises an annular array of reinforcing areas extending longitudinally along the sidewall in a direction between the top rim and the bottom end, the reinforcing areas being mutually separated by an annular array of spacer regions extending longitudinally along the sidewall in a direction between the top rim and the bottom end to provide alternating reinforcing areas and spacer regions around the annular sidewall, wherein the reinforcing areas and the spacer regions are between the top rim of the sidewall and the bottom end of the sidewall, wherein the reinforcing areas comprise expanded cellular foam of a first density and the spacer regions comprise expanded cellular foam of a second density, wherein the first density is higher than the second density, wherein the expanded cellular foam in the reinforcing areas of the first density has a more uniform size distribution, and a smaller average size, of cellular voids than the expanded cellular foam of the second density in the spacer regions.

2. A hollow article according to claim 1, wherein the expanded cellular foam in the reinforcing areas has a lower concentration of cellular voids than the expanded cellular foam in the spacer regions.

3. A hollow article according to claim 1, wherein the alternating reinforcing areas and spacer regions around the annular sidewall provide that each reinforcing area is located between opposite spacer regions and each spacer region is located between opposite reinforcing areas.

4. A hollow article according to claim 1, wherein the spacer regions comprise first and second spacer regions, the first spacer regions having a greater width, in a circumferential direction around the annular sidewall, than the second spacer regions, wherein the first and second spacer regions comprise expanded cellular foam, and the expanded cellular foam of the first spacer regions has a lower density than the expanded cellular foam of the second spacer regions.

5. A hollow article according to claim 4, wherein the first and second spacer regions alternate around the annular sidewall, and wherein the alternating reinforcing areas and first and second spacer regions around the annular sidewall provide a repeating sequence of a reinforcing area, a first spacer region, a reinforcing area, and a second spacer region.

6. A hollow article according to claim 1, wherein the reinforcing areas have a width, in a circumferential direction around the annular sidewall, of from 0.5 to 3 mm and wherein the spacer regions have a width, in a circumferential direction around the annular sidewall, of from 0.5 to 10 mm.

7. A hollow article according to claim 1, wherein the sidewall has a thickness of from 0.5 to 4 mm.

8. A hollow article according to claim 1, wherein the top rim comprises an annular ring of expanded cellular foam, and wherein the top rim is separated from an upper edge of the sandwich structure by an annular ring of the plastics material which is unexpanded.

9. A hollow article according to claim 1, wherein the base wall comprises a central gate region, a first annular ring of expanded cellular foam surrounding the gate region, and a plurality of first radial elements of expanded cellular foam extending radially outwardly towards the sidewall, the first radial elements being mutually separated by first segments of unexpanded plastics material.

10. A hollow article according to claim 9, wherein the base wall further comprises a second annular ring of expanded cellular foam surrounding, and connecting with the radially outer ends of, the plurality of first radial elements, and a plurality of second radial elements of expanded cellular foam extending radially outwardly towards the sidewall, the second radial elements being mutually separated by second segments of unexpanded plastics material, the radially outer ends of the plurality of second radial elements of expanded cellular foam connecting with the sidewall.

11. A hollow article according to claim 10, wherein the radially outer end of each of the plurality of second radial elements of expanded cellular foam connects with a respective spacer region in the sidewall.

12. A hollow article according to claim 9, wherein the unexpanded plastics material in the base wall has a thickness of from 0.25 to 0.75 mm.

13. A hollow article according to claim 9, wherein the expanded cellular foam of plastics material in the base wall has a thickness of from 0.5 to 1.75 mm.

14. A hollow article according to claim 1, further comprising at least one foot which extends downwardly from the bottom end of the sidewall and defines at least one lower surface which is located lower than a bottom surface of the base wall wherein the at least one foot is integrally moulded with the sidewall and the base wall.

15. A hollow article according to claim 14, wherein the at least one foot comprises a single annular foot having a single annular lower surface and the at least one foot comprises unexpanded plastics material.

16. A hollow article according to claim 14, wherein the at least one foot has a height of from 1.5 to 4 mm.

17. A hollow article according to claim 1, which is a beverage cup or food container composed of a single recyclable thermoplastic material, wherein the thermoplastic material is polyethylene, polypropylene, polyethylene terephthalate, polybutylene terephthalate, or polylactic acid.

18. A hollow article according to claim 1, which is a coffee cup which is thermally stable up to a temperature of at least 75° C.

19. A hollow article according to claim 1, wherein a ratio between the volume of the central hollow cavity, in $cm^3$, and the mass of the hollow article, in g, is from 2 to 3.

20. A hollow article according to claim 1, wherein the annular sidewall has an outer surface which is substantially smooth or is slightly undulating with slightly higher surfaces at the reinforcing areas.

* * * * *